United States Patent
Mototani et al.

[11] Patent Number: 5,482,798
[45] Date of Patent: Jan. 9, 1996

[54] ALKALINE MANGANESE BATTERY

[75] Inventors: Yuji Mototani, Yawata; Junichi Asaoka, Ikoma; Hitoshi Tanaka, Sapporo, all of Japan

[73] Assignee: Matsushita Electric Industrial Co., Ltd., Osaka, Japan

[21] Appl. No.: 406,595

[22] Filed: Mar. 20, 1995

[30]  Foreign Application Priority Data

Mar. 28, 1994 [JP] Japan ................................ 6-057335

[51] Int. Cl.$^6$ .................................................. H01M 4/50
[52] U.S. Cl. ........................................ 429/224; 429/232
[58] Field of Search ...................................... 429/224, 232

[56]  References Cited

U.S. PATENT DOCUMENTS 3,494,382  2/1970  Shane et al. .

FOREIGN PATENT DOCUMENTS

| 0170411A1 | 2/1986 | European Pat. Off. . |
| 54-26426A | 2/1979 | Japan . |
| 56-128578A | 10/1981 | Japan . |
| 63-232266A | 9/1988 | Japan . |
| 93/08123 | 4/1993 | WIPO . |

OTHER PUBLICATIONS

Patent Abstracts of Japan, vol. 005, No. 197 (E–086) 15 Dec. 1981 & JP-A-56 118267 (Hitachi Maxell Ltd) 17 Sep. 1981.

*Primary Examiner*—Stephen Kalafut
*Assistant Examiner*—Richard H. Lilley, Jr.
*Attorney, Agent, or Firm*—Stevens, Davis, Miller & Mosher

[57]  ABSTRACT

An alkaline battery having excellent discharge characteristics and higher discharge capacity with an increase in its internal resistance being suppressed is disclosed. The alkaline battery has a positive electrode active material which comprises primarily manganese dioxide and electroconductive carbon material. The electroconductive carbon material comprises expanded graphite particles having an average particle size in the range from 0.5 to 15 μm, and the content of the expanded graphite particles is in the range from 2 to 8% by weight based on the solids in the positive electrode active material.

4 Claims, 5 Drawing Sheets

ALKALINE MANGANESE BATTERY

BACKGROUND OF THE INVENTION

1. Field of the Invention

The present invention relates to an alkali-manganese battery containing manganese dioxide as positive electrode active material, and more particularly to an improvement of the positive electrode active material.

2. Description of the Related Art

In conventional alkali-manganese batteries, there have been used positive electrode active materials comprising a mixture of manganese dioxide particles and powdery carbon which was added to enhance the electroconductivity between the manganese dioxide particles as well as to improve the electroconductivity between a positive electrode can and the positive electrode active material contained therein instead of the use of manganese dioxide (ordinarily electrolytic manganese dioxide) particles alone as positive electrode active material because manganese dioxide itself has quite a low specific conductivity.

A higher content of powdery carbon in the mixed positive electrode active material gives rise to a reduced proportion of the manganese dioxide active material to be charged in the specific volume in the battery, which receives the mixture of the manganese dioxide active material and the powdery carbon. This causes a reduction in the discharge capacity of the battery, though the internal resistance of the battery is reduced. On the other hand, a lower content of powdery carbon increases the proportion of manganese dioxide to be charged in the battery with an increase in the internal resistance thereof. Since the increase in the proportion of the manganese dioxide active material to be charged opposes the reduction in battery's internal resistance of the battery in a manner as described above, it is important to achieve a compromise between them.

In order to achieve a compromise between the both requirements of increasing the amount of the manganese dioxide active material to be charged and of reducing the battery's internal resistance, there has been proposed the use of a positive electrode active material comprising a mixture of manganese dioxide particles and a 10% or more of carbon particles having the same average particle size as that of the manganese dioxide particles as disclosed in JP54-26426A and JP63-232266A).

SUMMARY OF THE INVENTION

An object of the present invention is to provide an alkali-manganese battery having an increased discharge capacity and excellent discharge characteristics by increasing the proportion of manganese dioxide as positive electrode active material to be charged in the alkali-manganese battery as much as possible with an increase in battery's internal resistance being suppressed.

Another object of the present invention is to provide an alkali-manganese battery containing a positive electrode active material which comprises primarily manganese dioxide and electroconductive carbon material, said electroconductive carbon material comprising expanded graphite particles having an average particle size in the range from 0.5 to 15 μm.

Still another object of the present invention is to provide an alkali-manganese battery as described above, wherein the content of the expanded graphite particles is in the range from 2 to 8% by weight based on the solids in the mixed positive electrode active material.

Still another object of the present invention is to provide an alkali-manganese battery as described above, wherein said expanded graphite is of artificial graphite origin.

DETAILED DESCRIPTION OF PREFERRED EMBODIMENTS

Figure 1:
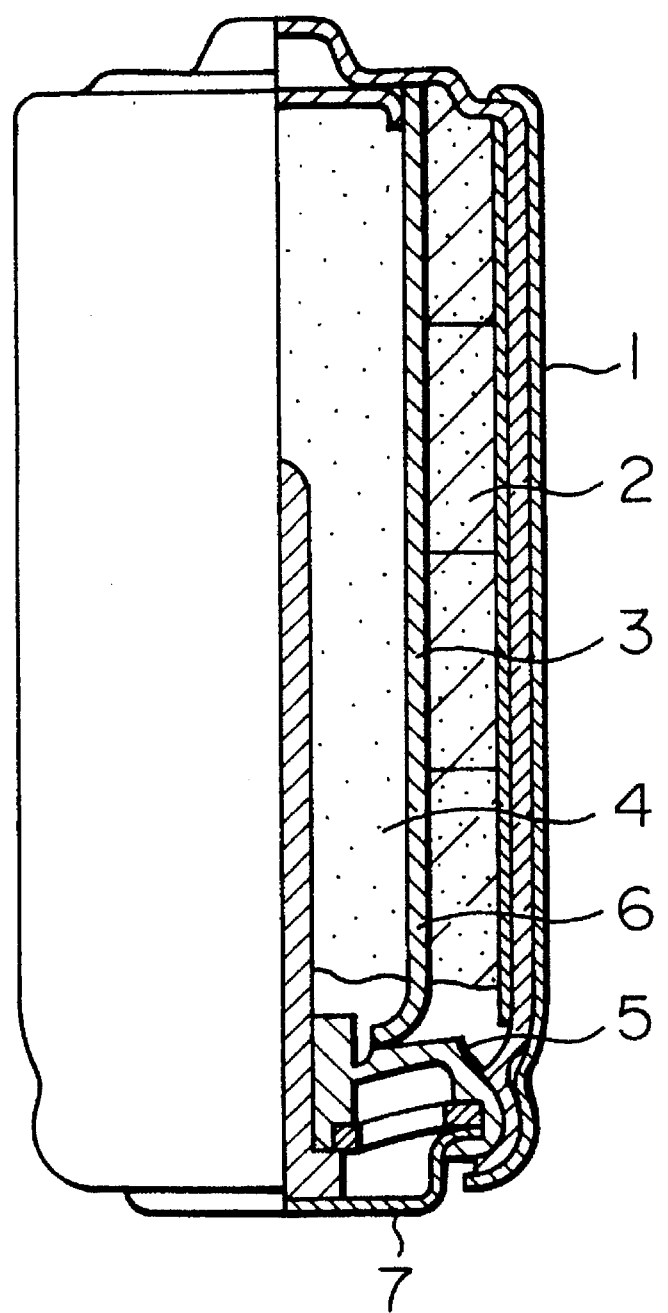
FIG. 1 shows a diagrammatical cross-sectional view taken in the longitudinal direction of the AA type alkaline battery LR6 in Examples.

According to the present invention, it has been found that the contact property between the carbon particles and manganese dioxide particles can be improved by the use of an expanded graphite having an average particle size in the range of 0.5 to 15 μm, preferably 0.5 to 6 μm instead of using the conventional carbon particles, which facilitates formation of electronically conductive network and reduces the amount of manganese dioxide particles not pertaining to an electrochemically reducing reaction, thereby resulting in an enhanced utilization of the manganese dioxide particles on the overall mixed positive electrode active material. The graphite particles obtained by crushing an expanded graphite may be presumed to have less number of carbon network planes in the graphite layered structure. For this reason, the expanded graphite particles have a reduced thickness in the direction of the C axis of the graphite crystal and gives an increased number of particles per unit weight which affords an increased number of contacts with particulate manganese dioxide, which in turn enhances the electronic conductivity of the mixed positive electrode active material. The particulate graphite has inherently a poor electronic conductivity in the direction parallel to the C axis of the graphite crystal and an excellent electronic conductivity in the direction perpendicular to the C axis, so that such thinner thickness in the C axis direction of the particles assures the high electronic conductivity of the mixed positive electrode active material even with a reduced amount of the electroconductive carbon material being incorporated. Moreover, expanded graphite has a configuration like flaky graphite and a sufficiently high compressibility to achieve more intimate contact with manganese dioxide particles as well as good moldability of the mixed positive electrode active material. This is considered contributable to the formation of good electronically conductive network with the manganese dioxide positive electrode active material. The artificial graphite which has been used heretofore has poor moldability and leads to higher specific resistance of the positive electrode active material containing the graphite under the conditions of a lower content of electroconductive carbon material of not higher than 10% and/or a smaller average particle size of the electroconductive carbon material of not larger than 15 μm. In contrast, the use of the expanded graphite excellent in electronic conductivity and moldability having a small average particle size of 0.5 to 15 μm, preferably 0.5 to 6 μm affords an increased number of graphite particles per unit weight and an increased number of contacts with particulate manganese dioxide as compared to those achieved with expanded graphite of larger particle size, which allows less number of graphite particles to be used to achieve desired characteristics. Thus, even a lower content of the electroconductive carbon material of 2 to 8% by weight, preferably 3 to 6% by weight ensures the mixed positive electrode active material a high moldability, suppresses an increase in battery's internal resistance and allows the proportion of manganese dioxide to be increased in the mixed positive electrode active material.

The expanded graphite should be produced from artificial graphite because artificial graphite contains less impurity such as iron and retains so lower level of impurity even after expanded as desired for use in battery material, though the expanded graphite is almost the same in the characteristics regarding electronic conductivity and moldability of the mixed positive electrode active material as the unexpanded artificial graphite. Particularly for alkali-manganese batteries with non-amalgamated zinc which require much less impure starting materials, the expanded graphite derived from artificial graphite as starting material is useful.

FIG. 1 shows a vertical side view of the cylindrical alkaline battery LR6 used in Examples with a cross-sectional view of a right side half. A positive electrode active material comprising a mixture of manganese dioxide and electroconductive carbon material 2 is charged in a metal case 1, a separator 3 is inserted, and then a gel-like negative electrode 4 is poured into the inside of the separator 3. A negative collector 6 integrated with a resin seal 5 and a bottom plate 7 is plugged in the gel-like negative electrode to form a unit battery.

The present invention is illustrated with reference to Examples.

EXAMPLE 1

Figure 2:
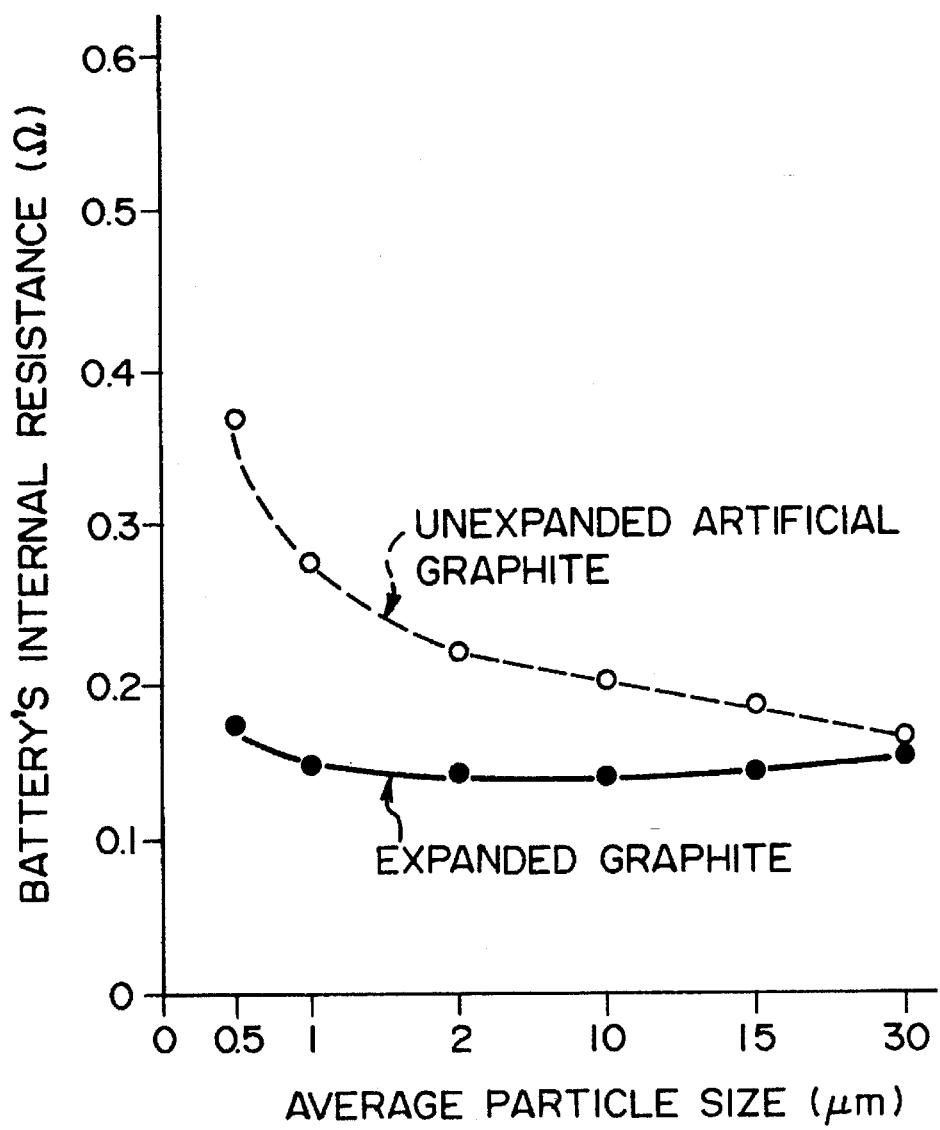
FIG. 2 is a graph showing the relationship between the average particle size of graphite and the internal resistance of the battery.
Figure 3:
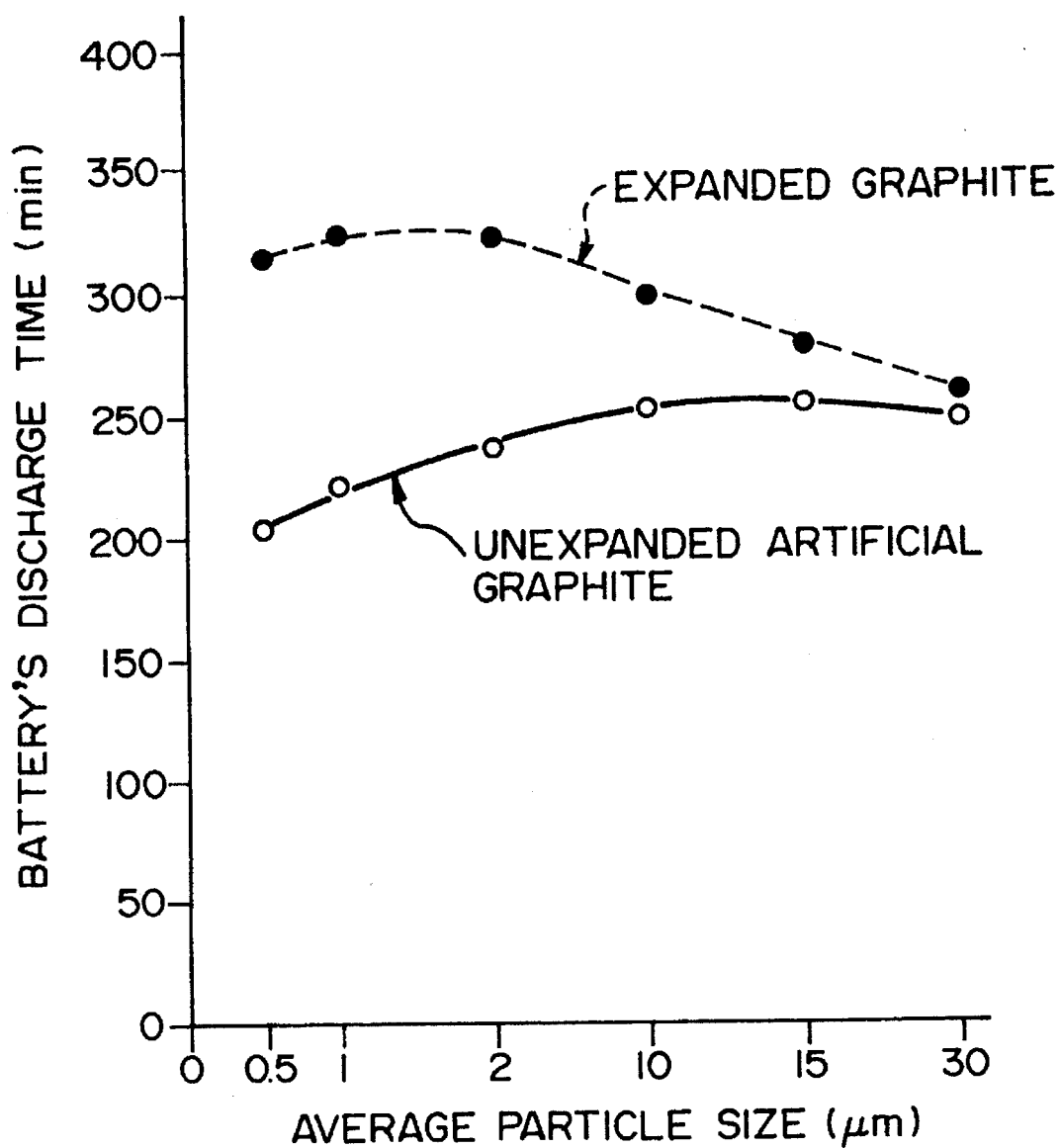
FIG. 3 is a graph showing the relationship between the average particle size of graphite and the discharge time of the battery.

LR6 type alkali-manganese batteries were prepared with a mixed positive electrode active material (2) containing 4% by weight of an electroconductive carbon material having a varying average particle size in the range of 0.5 to 30 μm, wherein the carbon material was conventional artificial graphite particles or expanded graphite particles which had been prepared by introducing sulfuric acid into between interlayers of the artificial graphite used as starting material and heating rapidly the graphite at a temperature of 800° to 1000° C. to expand greatly spaces between the interlayers of the graphite in the direction perpendicular to the plane of interlayer and then crushing the resultant expanded graphite. The batteries were evaluated for discharge characteristics. Test data were obtained for battery's internal resistance and continuously discharging time under a load of 3.9 Ω with a terminal voltage of 0.9 V. FIG. 2 shows the internal resistance and FIG. 3 shows the continuously discharging time under a load of 3.9 Ω when the average particle sizes of the expanded graphite and unexpanded artificial graphite were varied in the range of 0.5 to 30 μm.

When the electroconductive carbon material used was the expanded graphite having an average particle size in the range from 15 to 0.5 μm, the batteries were more effectively suppressed in an increase in their internal resistance than those using the unexpanded artificial graphite having the same average particle size, and exhibited a lower internal resistance than that (about 0.2 Ω) obtained with the conventional artificial graphite having an average particle size of 30 μm. When the expanded graphite had an average particle size of 30 μm, the batteries were little different from those with the artificial graphite having an average particle size of 30 μm. Thus the use of the expanded graphite having an average particle size in the range from 0.5 to 15 μm affords enhanced moldability of the mixed positive electrode active material, which enables the use of graphite particles having a smaller particle size with a higher number of graphite particles per unit weight to achieve an satisfactory electronic conductivity. Even with expanded graphite, however, a smaller average particle size less than 0.5 μm thereof results in a reduced adhesiveness of the graphite particles to manganese dioxide particles which leads to poor electronic conductivity. Next, for the continuous discharge capacity under a load of 3.9 Ω with a terminal voltage of 0.9 V, the use of the expanded graphite having an average particle size in the range from 15 to 0.5 μm as electroconductive carbon material enables longer discharge times than those achieved with unexpanded artificial graphite having the same average particle size, thus affords more excellent discharge characteristics. When the expanded graphite had an average particle size of 30 μm, the batteries were little different from those with the unexpanded artificial graphite having an average particle size of 30 μm. It has also been found that the use of unexpanded artificial graphite having a smaller average particle size renders the discharge time shorter, while the use of expanded graphite allows reaching a maximum discharge time within the range of average particle size from about 1 to 2 μm.

EXAMPLE 2

Figure 4:
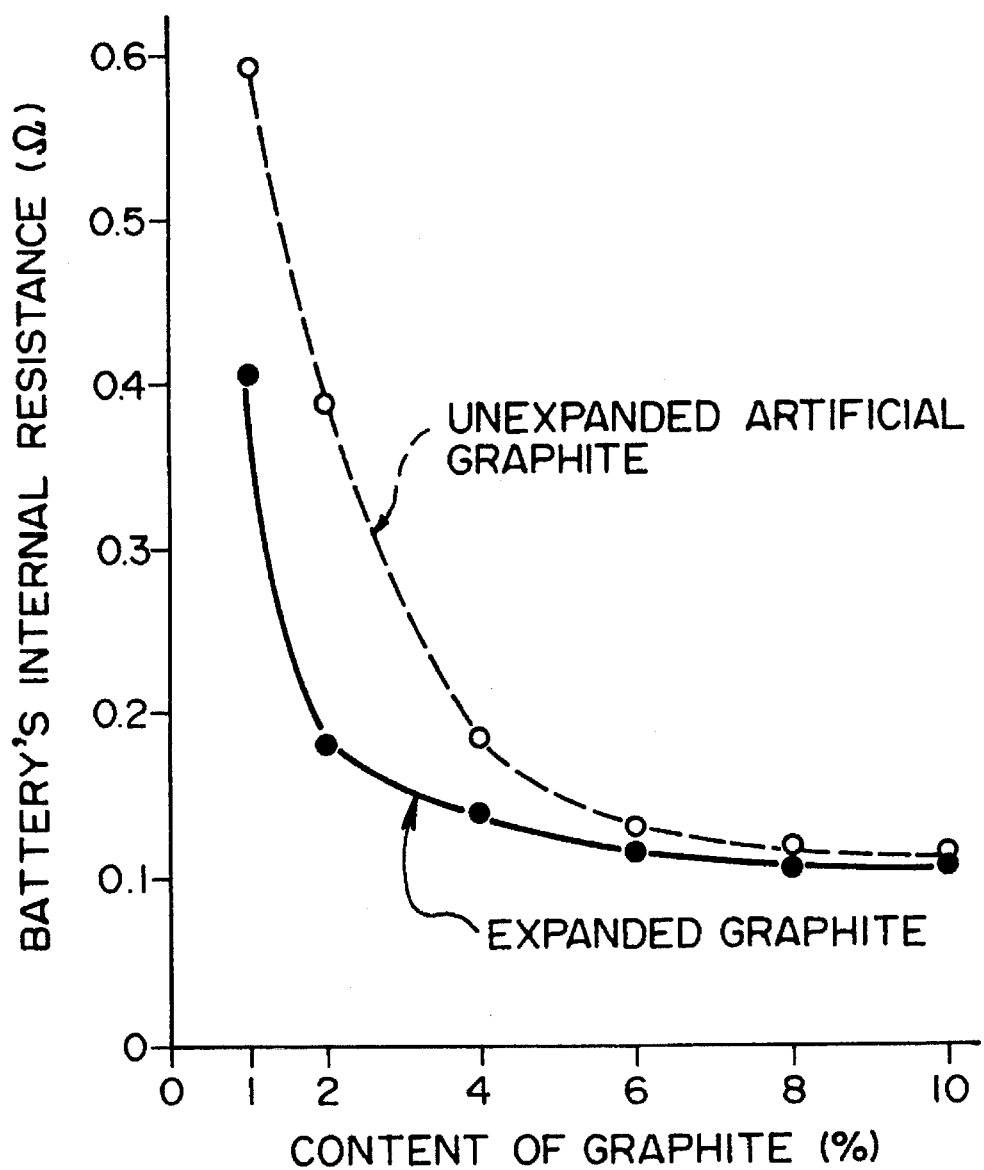
FIG. 4 is a graph showing the relationship between the content of graphite and the internal resistance of the battery.
Figure 5:
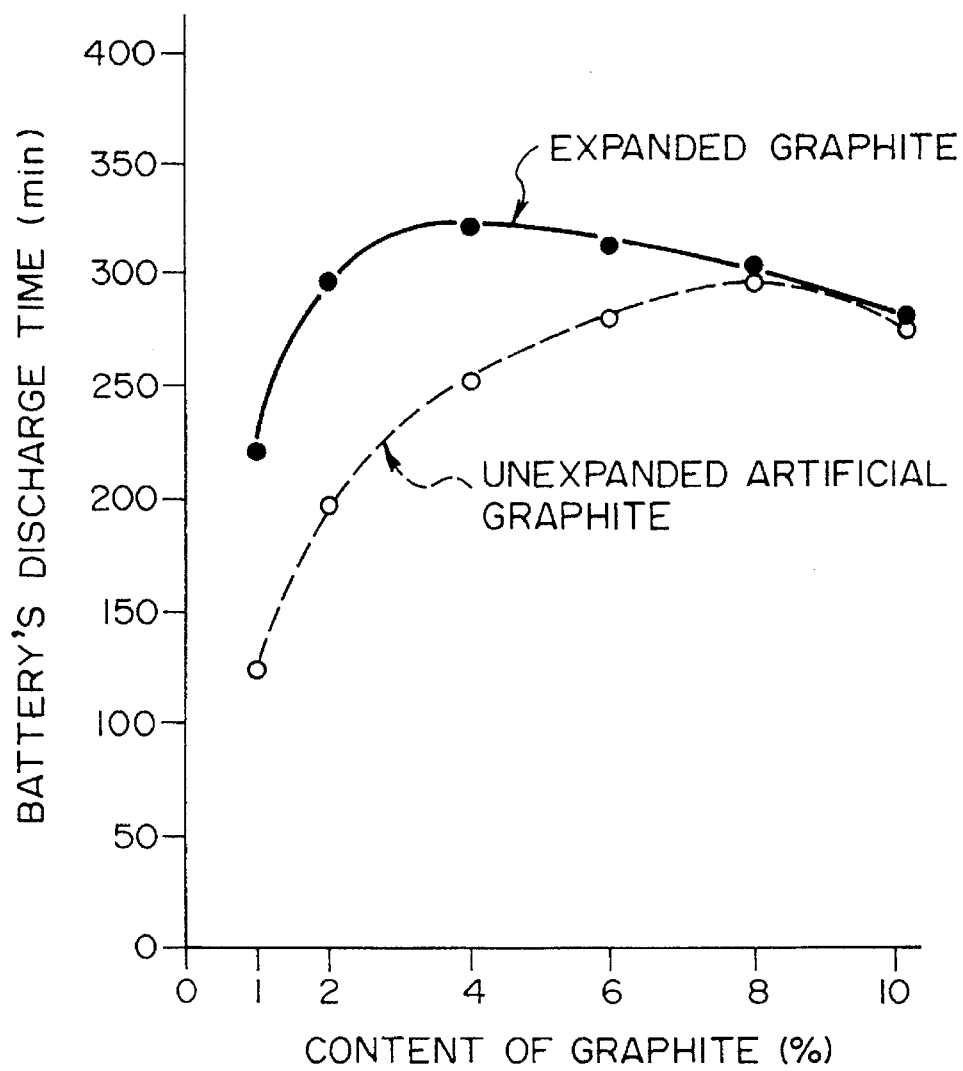
FIG. 5 is a graph showing the relationship between the content of graphite and the discharge time of the battery.

LR6 type alkali-manganese batteries were prepared with a mixed positive electrode active material (2) containing a varying weight in the range from 1 to 10% by weight of an electroconductive carbon material, wherein the carbon material was the expanded graphite particles having an average particle size of 2 μm, or the unexpanded artificial graphite particles having an average particle size of 30 μm. The batteries were subjected to identical discharge tests to those in Example 1. FIG. 4 shows the relationship between the internal resistance and the content of graphite when the amounts of the expanded graphite and the unexpanded artificial graphite were varied in the range from 1 to 10% by weight, and FIG. 5 shows the relationship between the continuously discharging time under a load of 3.9 Ω and the content of graphite.

When the expanded graphite was used as electroconductive carbon material in a content of the graphite in the range from 8 to 1% by weight, the graphite suppressed more effectively an increase in battery's internal resistance than the unexpanded artificial graphite used in the same content. Next when the content of the expanded graphite is 10% by weight, the batteries were little different from those using a content of the unexpanded artificial graphite of 10% by weight. The internal resistance of the batteries increase with reducing the content of electroconductive carbon material. A content of the unexpanded artificial graphite having an average particle size of 30 μm of less than 4% by weight and a content of the expanded graphite having an average particle size of 2 μm of less than 2% by weight were both unsatisfactory for batteries in view of workability of appliances equipped with the batteries because of battery's internal resistance higher than 0.2 Ω. Next for the continuous discharge capacity under a load of 3.9 Ω with a terminal voltage of 0.9 V, the use of the expanded graphite in a content of 8 to 1% by weight as electroconductive carbon material results in longer discharge times than those achieved with unexpanded artificial graphite in the same content, thus can gives more excellent discharge characteristics. When the content of the expanded graphite is lower than 2% by weight, the batteries exhibited shorter discharge times indicating that they were inferior in discharge characteristics to those using a content of the unexpanded artificial graphite of 10% by weight. Moreover, when the content of the expanded graphite used as electroconductive carbon material is 10% by weight, the resultant batteries were little different from those using a content of the unexpanded artificial graphite of 10% by weight. It has also been found that when the unexpanded artificial graphite was used as electroconductive carbon material, the discharge time reached a maximum at a content of the graphite of about 8% by weight, while the use of expanded graphite allows reaching a maximum discharge time at a content of the graphite of about 4% by weight. From the foregoing test results, it can be found that when the expanded graphite is used as electroconductive carbon material and its content is in the range from 2 to 8% by weight, an increase in battery's internal resistance can be suppressed and enhanced discharge characteristics can be achieved.

Though the expanded graphite used here as well as in Example 1 were derived from artificial graphite as starting material, other expanded graphites derived from naturally occurring graphite such as flaky or scale-like graphite have been found to have physical properties such as electronic conductivity and moldability not inferior to those of artificial graphite and have been confirmed to be capable of suppressing an increase in battery's internal resistance and affording excellent discharge characteristics.

As described above, the present invention provides an alkaline battery having a higher discharge capacity and excellent discharge characteristics with an increase in its internal resistance being suppressed by using expanded graphite particles.

What is claimed is:

1. An alkali-manganese battery having a positive electrode active material which comprises primarily manganese dioxide and electroconductive carbon material, said electroconductive carbon material comprising expanded graphite particles having an average particle size in the range from 0.5 to 15 μm.

2. The alkali-manganese battery according to claim 1, wherein the content of said expanded graphite particles is in the range from 2 to 8% by weight based on the solids in said positive electrode active material.

3. The alkali-manganese battery according to claim 1 wherein the expanded graphite, of said expanded graphite particles, is of artificial origin.

4. The alkali-manganese battery according to claim 2, wherein the expanded graphite, of said expanded graphite particles, is of artificial origin.

* * * * *